(12) United States Patent
Cheng (10) Patent No.: US 10,248,162 B1
(45) Date of Patent: Apr. 2, 2019

(54) LINKING-UP MECHANISM MODULE AND DOCKING STATION

(71) Applicant: GETAC TECHNOLOGY CORPORATION, Hsinchu County (TW)

(72) Inventor: Kuo-Heng Cheng, Taipei (TW)

(73) Assignee: GETAC TECHNOLOGY CORPORATION, Hsinchu County (TW)

( * ) Notice: Subject to any disclaimer, the term of this patent is extended or adjusted under 35 U.S.C. 154(b) by 0 days.

(21) Appl. No.: 16/040,483

(22) Filed: Jul. 19, 2018

(51) Int. Cl.
  *G06F 1/16* (2006.01)
  *F16M 11/04* (2006.01)
  *F16B 2/02* (2006.01)

(52) U.S. Cl.
  CPC ......... *G06F 1/1632* (2013.01); *F16M 11/041* (2013.01); *F16B 2/02* (2013.01)

(58) Field of Classification Search
  CPC ........ G06F 1/1632; F16M 11/041; F16B 2/02
  USPC .............................. 361/679.01, 679.4–679.44
  See application file for complete search history.

(56) References Cited

U.S. PATENT DOCUMENTS

| 6,093,039 | A | * | 7/2000 | Lord | H01R 13/627 |
| | | | | | 361/679.41 |
| 2003/0147209 | A1 | * | 8/2003 | Oross | G06F 1/1632 |
| | | | | | 361/679.4 |
| 2004/0012922 | A1 | * | 1/2004 | Kamphuis | G06F 1/1632 |
| | | | | | 361/679.02 |
| 2004/0145864 | A1 | * | 7/2004 | Usui | G06F 1/1632 |
| | | | | | 361/679.41 |
| 2004/0223293 | A1 | * | 11/2004 | Nakano | G06F 1/1632 |
| | | | | | 361/679.43 |
| 2010/0265652 | A1 | * | 10/2010 | Agata | G06F 1/1632 |
| | | | | | 361/679.41 |
| 2012/0212910 | A1 | * | 8/2012 | Katsuta | E05B 73/0082 |
| | | | | | 361/747 |

* cited by examiner

*Primary Examiner* — Steven T Sawyer
*Assistant Examiner* — Sagar Shrestha (57) ABSTRACT

A present invention provides a linking-up mechanism module and a docking station including a shell and the linking-up mechanism module. The linking-up mechanism module is provided at the shell, and includes a switch, a clasp element, a linking-up structure and an abutting element. The linking-up structure is connected to the switch, the clasp element and the abutting element. When the docking station is in a clasping state, the switch is at a first position, the clasp element is at a clasping position, and the abutting element is at a sunken position. When the switch is pressed to a second position to cause the docking station to enter an uplifting state, the linking-up structure and the clasp element are synchronously driven. After the clasp element is rotated to an unlocking position, the linking-up structure is driven to drive and uplift the abutting element from the sunken position to an uplifting position.

6 Claims, 6 Drawing Sheets

LINKING-UP MECHANISM MODULE AND DOCKING STATION

BACKGROUND OF THE INVENTION

Field of the Invention

The invention relates to a linking-up mechanism module and a docking station, and more particularly to a docking station, which can be electrically connected to an electronic device and includes the linking-up mechanism module to uplift the electronic device.

Description of the Prior Art

Current portable electronic devices are developed in aim of being light and thin, and thus an electronic device itself is provided with a limited number of electrical connectors (e.g., a USB female connector). A user can choose to place a portable electronic device on a docking station and electrically connect the portable electronic device to the docking station, wherein the docking station includes multiple electrical connectors. A user can plug an external electronic device (e.g., a USB drive) on the docking station, and the portable electronic device can then read information from the external electronic device through the docking station.

When a conventional docking station is connected to a portable electronic device, the portable electronic device is closely bonded with the docking station. Further, because the portable electronic device is light and thin, during the process of separating the portable electronic device from the docking station, the portable electronic device may not be easily and directly removed from the docking station due to the lack of an appropriate point of application.

Therefore, there is a need for a novel docking station including a structure that allows a portable electronic device to be quickly separated therefrom.

SUMMARY OF THE INVENTION

To achieve the above object, the present invention provides a linking-up mechanism module and a docking station. The docking station includes a linking-up mechanism module. Through the linking-up mechanism module, the docking station is able to a repeatedly clasp in a clasping state and uplift in an uplifting state an electronic device.

The present invention discloses a linking-up mechanism module applied to a docking station. The linking-up mechanism module includes a clasp element, an abutting element, a linking-up structure and a switch. The clasp element in a clasping state clasps the electronic device, and the abutting element in an uplifting state uplifts the electronic device. The linking-up structure is connected to the switch and the clasp element, and the abutting element is connected to the linking-up structure. The switch is for driving the linking-up structure to release the clasp element to disengage the clasping state, and driving the linking-up structure to uplift the abutting element to enter the uplifting state.

The linking-up structure includes a driving element, a first shaft, a driven element, and a second shaft. The first shaft is connected to the switch and the driving element, and the second shaft is for the driven element to be fixed thereon. When the switch, the first shaft and the driving element synchronously rotate to enter the uplifting state from the clasping state, the driving element drives the driven element to rotate the second shaft.

The linking-up structure includes a fixed seat provided at a shell. The first shaft and the second shaft are substantially parallel to each other and may be rotatably and pivotally provided on the fixed seat. The abutting element is mounted on the second shaft. When the abutting element, the second shaft and the driven element synchronously rotate to enter the clasping state from the uplifting state, the driven element releases the driving element to allow the first shaft to rotate.

The linking-up structure further includes a first elastic element and a second elastic element. The first elastic element provides a first elastic restoring force for the driving element to rotate towards the clasping state. The second elastic element provides a second elastic restoring force for the abutting element to rotate towards the uplifting state.

A docking station of the present invention is adapted to repeatedly clasp in a clasping state and uplift in an uplifting state an electronic device. The docking station includes a shell and a linking-up mechanism module. The linking-up mechanism module is provided at the shell, and includes a switch, a clasp element, a linking-up structure and an abutting element. In the clasping state, the switch is located at a first position, the clasping element is located at a clasping position, and the at least one abutting element is located at a sunken position. When the switch is pressed to a second position to enter the uplifting state, the linking-up structure and the clasping element are synchronously driven, and the clasping element first rotates to an unlocking position and then drives the linking-up structure to drive and uplift the at least one abutting element from the sunken position to an uplifting position.

The shell has a first surface, a first opening, and at least one second opening. When the clasp element is located at the clasping position, the clasp element protrudes out of the first opening and clasps the electronic device. When the clasp element is at the unlocking position, the clasp element is rotated to become located in the first opening, and the at least one abutting element is uplifted to the uplifting position and protrudes out from the at least one second opening so as to push the electronic device away from the first surface.

The linking-up structure includes a fixed seat, a driving element, a first shaft, a second shaft and a driven element. The fixed seat is provided at the shell. The driving element has a first end portion and a second end portion, wherein the second end portion is opposite the first end portion, and the first end portion is connected to the clasp element. The first shaft is rotatably provided on the fixed seat, and is individually connected to the switch and the second end portion of the driving element. The second shaft is rotatably provided on the fixed seat. The driven element has a third end portion and a fourth end portion, wherein the fourth end portion is opposite the third end portion and is connected to the second shaft. The abutting element has a fifth end portion and a sixth end portion, wherein the sixth end portion is opposite the fifth end portion, the fifth end portion is connected to the second shaft, and the sixth end portion uplifts the electronic device. When the switch is located at the first position, the clasp element is located at the clasping position to cause the second end portion of the driving element to abut against the third end portion of the driven element, and the at least one abutting element is located at the sunken position. When the switch is pressed to the second position, the first shaft rotates accordingly to drive and rotate the driving element, the first end portion is away from the third end portion, and the third end portion rotates along with the fourth end portion, such that the second shaft is rotated and drives and rotates the at least one abutting element to further uplift the least one abutting element from the sunken position to the uplifting position.

The linking-up structure further includes a first elastic element and a second elastic element. The first elastic element is sleeved on the first shaft, and is connected between the clasp element and the fixed seat. The second elastic element is connected between at least one first hook portion of the fixed seat and the fifth end portion. When the clasp element is located at the unlocking position, the first elastic element provides a first elastic restoring force. When the second end portion of the driving element abuts against the third end portion of the driven element, the first elastic restoring force pushes the clasp element to the clasping position, the at least one abutting element at the same time is located at the sunken position, and the fifth end portion is away from the fixed seat, such that the second elastic element is stretched to produce a second elastic restoring force. When the second shaft rotates, the second elastic restoring force provided by the second elastic element uplifts the abutting element from the sunken position P3 to the uplifting position.

The driven element further includes a recessed portion that is connected between the third end portion and the fourth end portion. When the clasp element is located at the unlocking position, the two end portions are abutted in the recessed portion, and the fifth end portion is close to the at least one first hook portion.

The shell has a second surface, which is opposite the first surface. A plurality of bumps are formed on the second surface. The fixed seat has a third surface, which is connected to the bumps such that the fixed seat is located at an interval below the second surface.

To better understand the objects, technical features and advantages above, detailed description of preferred embodiments is to given with the accompanying drawings below.

DETAILED DESCRIPTION OF THE EMBODIMENTS

Figure 1:
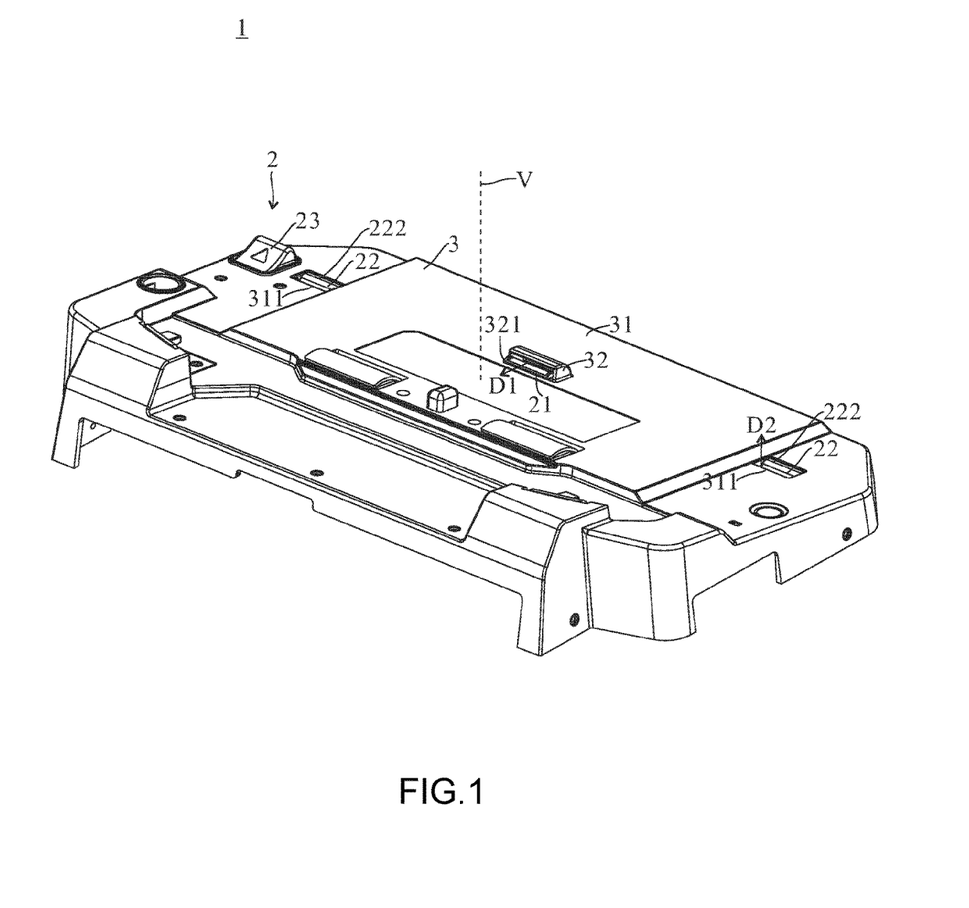
FIG. 1 is a perspective schematic diagram of a docking station in a clasping state according to an embodiment of the present invention.
Figure 2:
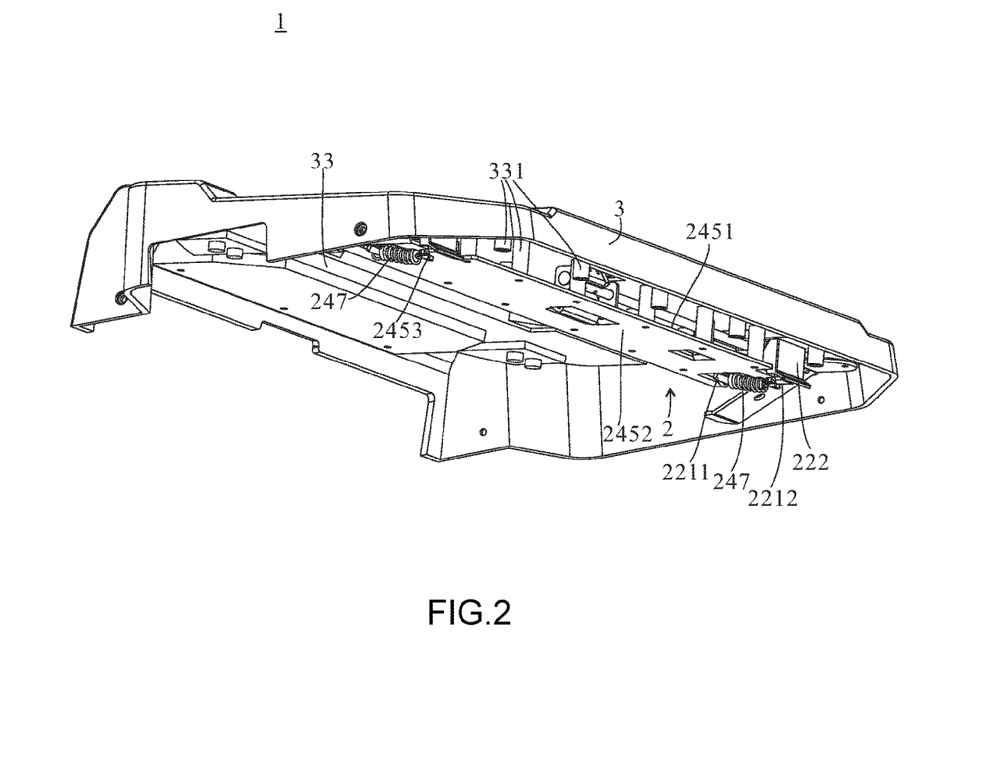
FIG. 2 is another perspective schematic diagram of a docking station in a clasping state according to an embodiment of the present invention.

As shown in FIG. 1 and FIG. 2, a docking station 1 of the present invention includes a linking-up mechanism module 2 and a shell 3. The linking-up mechanism module 2 is provided on the shell 3. When an electronic device is matched and assembled with the shell 3, the electronic device can be repeatedly clasped in a clasping state and uplifted in an uplifting state through the linking-up mechanism module 2. Structures and corresponding relationships of the components are given in detail below.

Figure 3:
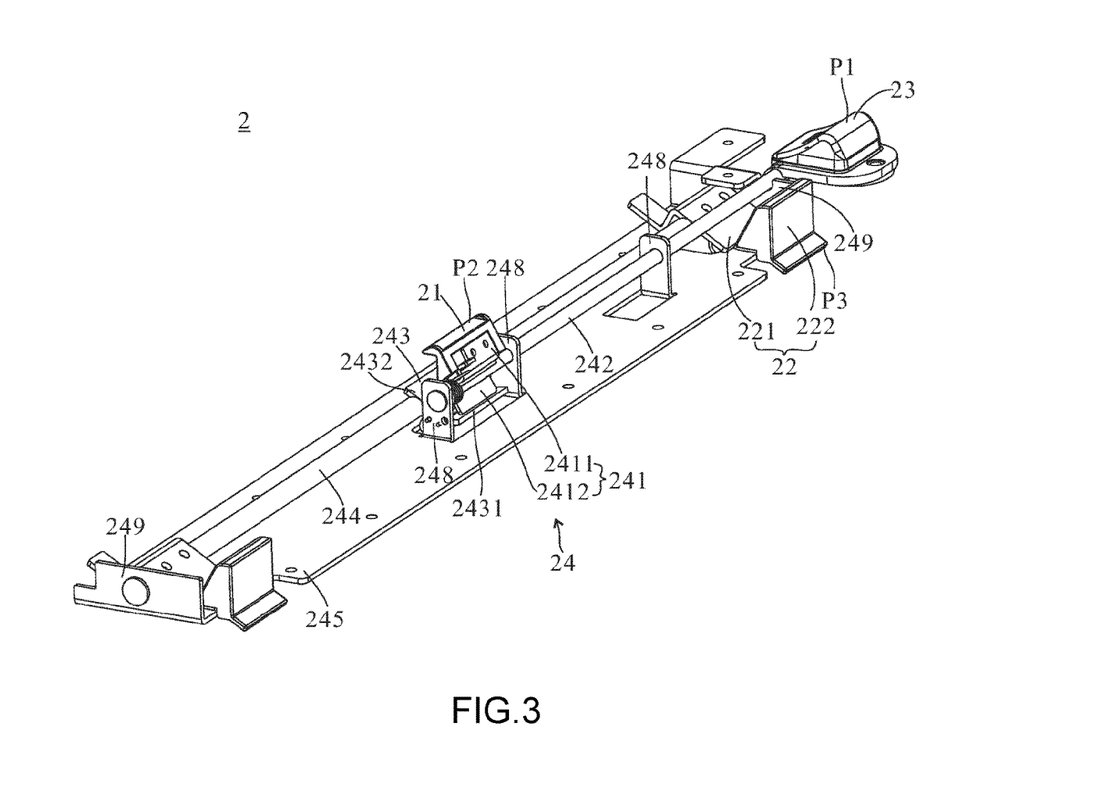
FIG. 3 is a perspective schematic diagram of a linking-up mechanism module in a clasping state according to an embodiment of the present invention.
Figure 4:
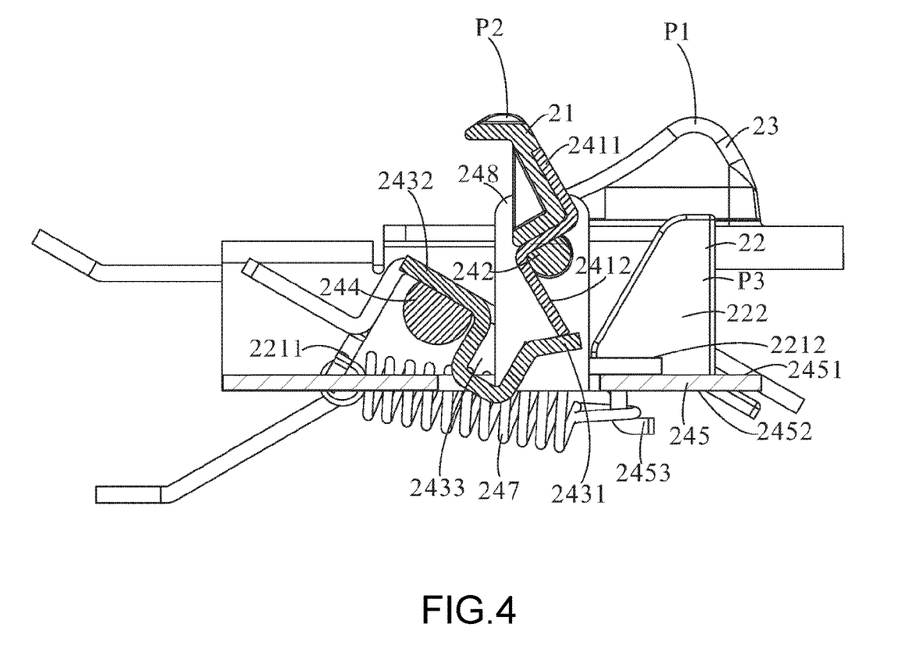
FIG. 4 is a partial section view of a linking-up mechanism module in a clasping state according to an embodiment of the present invention.

Referring to FIG. 3 and FIG. 4, the linking-up mechanism module 2 includes a clasp element 21, an abutting element 22, a switch 23 and a linking-up structure 24. In this embodiment, the clasp element 21 is hook-shaped, and the abutting element 22 includes a swinging element 221 and an abutting unit 222 (the swinging element 221 is a metal element and the abutting unit 222 is a plastic element in this embodiment). The swinging element 221 has a fifth end portion 2211 and a sixth end portion 2212. The abutting unit 222 is connected to the sixth end portion 2212, and appears as a triangular prism in shape. The linking-up structure 24 includes a driving element 241, a first shaft 242, a driven element 243, a second shaft 244, a fixed base 245, a first elastic element 246 and two second elastic elements 247. The driving element 241 appears similar to a Z-shape, and has a first end portion 2411 and a second end portion 2412. The first end portion 2411 is opposite the second end portion 2412. The driven element 243 appears similar to a U-shape, and has a third end portion 2431, a fourth end portion 2432 and a recessed portion 2433. The third end portion 2431 and the fourth end portion 2432 are extended from two sides of the recessed portion 2433. The fixed seat 245 has a third surface 2451 and a fourth surface 2452, a plurality of first platforms 248 and a plurality of second platforms 249 are provided on the third surface 2451, and two first hook portions 2453 formed on the fourth surface 2452, wherein the first hook portions 2453 are opposite the fifth end portion 2211. Further, in this embodiment, the first elastic element 246 is a torsion spring, and each of the second elastic elements 247 is a tension spring.

The clasp element 21 is provided on the first end portion 2411 of the driving element 241. The first shaft 242 is rotatably passed through the first platforms 248, and two ends of the first shaft 242 are respectively connected to the switch 23 and the first end portion 2411 of the driving element 241. The driven element 243 is correspondingly provided adjacent to the driving element 241, such that the driven element 243 may selectively mutually interfere with the driving element 241. The second shaft 244 is rotatably passed through the second platforms 249 and is substantially parallel to the first shaft 242. The center part of the second shaft 244 is connected to the fourth end portion 2432 of the driven element 243, and two ends of the second shaft 244 are respectively connected to the fifth end portion 2211 of the swinging element 221. One end of the first elastic element 246 is fastened on one of the first platforms 248, and the other end of the first elastic element 246 is provided on the first end portion 2411 of the driving element 241. One end of each second elastic element 247 is hooked at one first hook portion 2453 of the fixed seat 245, and the other end of each second elastic element 247 is hooked on the fifth end portion 2211.

As shown in FIG. 1 and FIG. 2, the shell 3 has a first surface 31 and a second surface 33, wherein the first surface 31 is opposite the second surface 33. A covering portion 32 is formed on the first surface 31 and located at a center of the first surface 31, and defines a first opening 321. An opening direction D1 of the first opening 321 is substantially perpendicular to a normal line V of the first surface 31. Two second openings 311 are formed on the first surface 31, and the first opening 321 is located between the two second openings 311. An opening direction D2 of the second openings 311 is parallel to the normal line V of the first surface 31. As shown in FIG. 2, there are a plurality of bumps 331 below the second surface 33, and the height of the bumps 331 is greater than those of the first platforms 248 and the second platforms 249. Thus, a third surface 2451 of the fixed seat 245 may be connected to the bumps 331, such that a part of the components of the linking-up mechanism module 2 are covered by the shell 3.

The docking station 1 in a clasping state is described in detail below. As shown in FIG. 3 and FIG. 4, an electronic device is placed on the first surface 31 (not shown), and the switch 23 is located at a first position P1 and protrudes out from the first surface 31. The clasp element 21 is located at a clasping position P2; that is, the clasp element 21 extends out from the first opening 321 and hooks the electronic device. Because the clasp element 21 extends out towards the first opening 321, no pressure is applied on the first elastic element 246, and thus an elastic restoring force of the first elastic element 246 at this point is the smallest. Further, the second end portion 2412 of the driving element 241 presses the third end portion 2431 of the driven element 243, in a way that a distance between the fifth end portion 2211 of the swinging element 221 and the first hook portion 2453 is the longest, thus stretching the second elastic element 247. When the second elastic element 247 in the clasping state, a largest second elastic restoring force is produced, and the abutting element 22 is at a sunken position P3, that is, the abutting unit 222 is located below the first surface 31.

Figure 5:
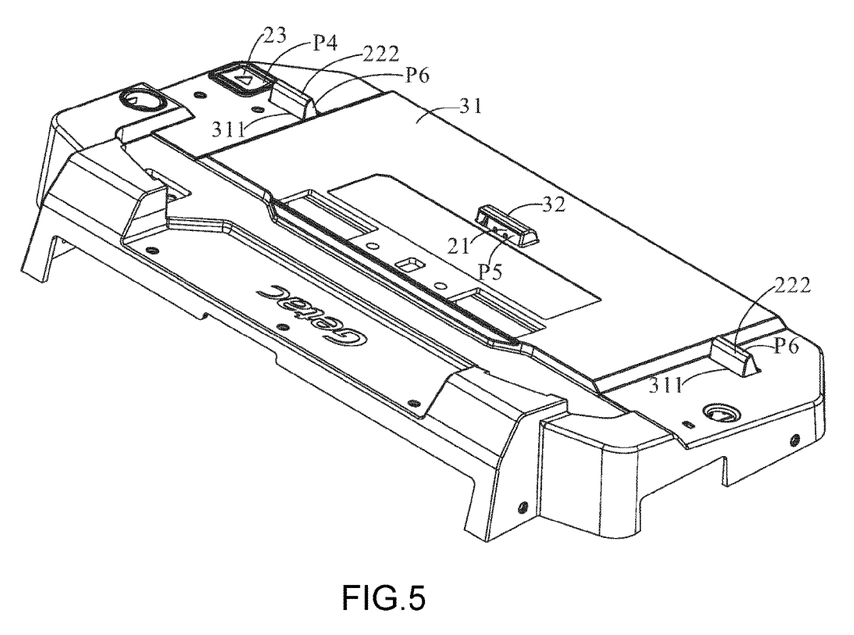
FIG. 5 is a perspective schematic diagram of a linking-up mechanism module in an unlocking state according to an embodiment of the present invention.
Figure 6:
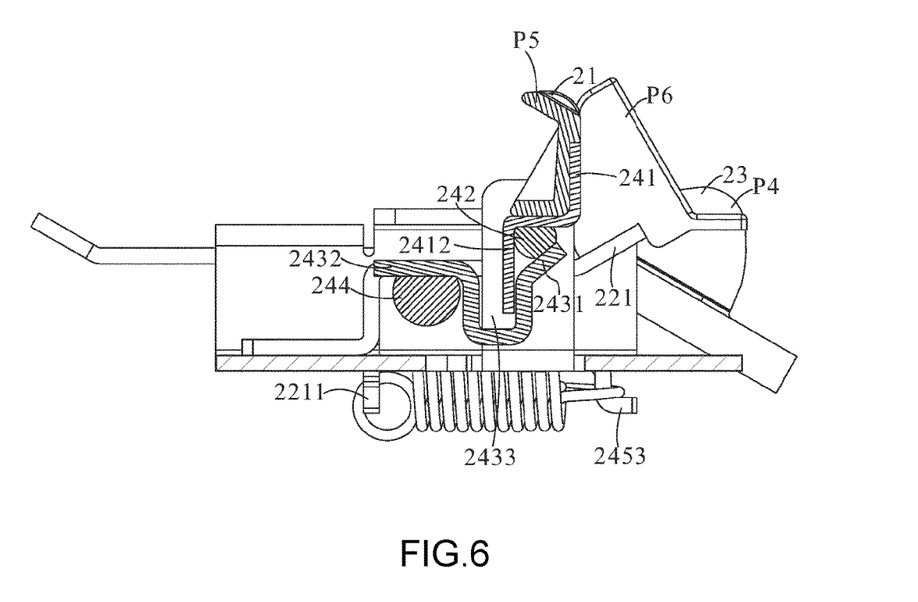
FIG. 6 is a partial section view of a linking-up mechanism module in an unlocking state according to an embodiment of the present invention.

FIG. 5 and FIG. 6 show the docking station 1 in an uplifting state. When the docking station 1 is to enter an uplifting state from a clasping state (changing from the state in FIG. 4 to the state in FIG. 6), the switch 23 is pressed to move from the first position P1 to a second position P2, such that the switch 23 is located below the first surface 31 to drive and rotate the first shaft 242. The first shaft 242 then drives and rotates the driving element 241 until the second end portion 2412 of the driving element 241 is located in the recessed portion 2433, and the clasp element 21, driven by the driving element 241, becomes located at an unlocking position P5 and is concealed in the covering portion 32. Hence, the electronic device is disengaged from the clasping relationship with the clasp element 21, and the first elastic element 246 is twisted as the clasp element 21 is moved and produces a first elastic restoring force. The driven element 243, free from the pressure of the driving element 241, rotates to drive and rotate the second shaft 244, and the second shaft 244 then drives and rotates the swinging element 221. At this point, the second elastic element 247 provides the second elastic restoring force for the abutting element 22 to move from the sunken position P3 to the uplifting position P6; that is, the abutting unit 222 extends out from the second opening 311 to become located on the first surface 31, and abuts and uplifts the electronic device to a certain height. Thus, the docking station 1 is completely in the uplifting state. In this state, a distance between the fifth end portion 2211 and the first hook portion 2453 is the shortest, and the force provided by the second elastic element 247 is also the smallest, whereas the first elastic force provided by the first elastic element 246 is the largest. Further, in the uplifting state, a user is able to stretch a hand to the gap between the electronic device and the first surface 31 so as to separate the electronic device from the docking station 1.

When the docking station 1 is to re-enter the clasping state from the uplifting state (changing from the state in FIG. 6 to the state in FIG. 4), the switch 23 is moved from the second position P4 to the first position P1. At this point, the first shaft 242 again rotates, the first elastic element 246 provides the first elastic restoring force to provide energy for the clasp element 21 to move from the unlocking position P5 to the clasping position, and the second end portion 2412 of the driving element 241 again moves from the recessed portion 2433 to the press the third end portion 2431 of the driven element 243. Accordingly, the driven element 243 rotates to drive the abutting element 22 to move from the uplifting position P6 to the sunken position P3, the first end portion 2211 is away from the first hook portion 2453, and the second elastic element 247 is again stretched to produce the largest second elastic restoring force to provide energy for the abutting element 22 to again enter the uplifting state. Associated repeated details are omitted herein.

It should be noted that, when the first elastic element 246 is provided at the driving element 241 and on one of the first platforms 248, and when the second elastic element 247 is provided between the fifth end portion 2211 and the first hook portion 2453, both of the first elastic element 246 and the second elastic element 247 are pre-twisted or pre-pulled to a certain extent, so as to ensure that the first elastic element 246 and the second elastic element 247 do not loosen from other components even when not twisted or stretched. Further, it is to be again emphasized that, before the docking station 1 enters the clasping state (in the uplifting state), the first elastic restoring force provided by the first elastic element 246 is the largest, and so the first elastic element 246 provides a force for the clasp element 21 to move from the unlocking position P5 to the clasping position. Before the docking station 1 enters the uplifting state (in at the clasping state), the elastic restoring force provided by the second elastic element 247 is the largest, and so the second elastic element 247 provides a force for the abutting element 22 to move from the sunken position P3 to the uplifting position P6.

In conclusion, in the present invention, all of the components of the linking-up mechanism module are first provided on the fixed seat and then further combined with the shell 3, thus effectively simplifying the assembly process of the linking-up mechanism module. Further, through the abutment of the abutting element 22, an electronic device can be conveniently combined with or separated from the docking station, providing a user with more convenient operations.

While the invention has been described by way of example and in terms of the preferred embodiments to explain the technical features of the present invention, it is to be understood that the invention is not limited thereto. Any modifications and equivalent arrangements that can be made by a person skilled in the art are to be encompassed within the scope of the present invention, which should be accorded with the broadest interpretation of the appended claims.

What is claimed is:

1. A linking-up mechanism module, applied to a docking station, the docking station adapted to repeatedly clasp in a clasping state and uplift in an uplifting state an electronic device, the linking-up mechanism module comprising:

a clasp element, clasping in the clasping state the electronic device;

an abutting element, uplifting in the uplifting state the electronic device; and a linking-up structure, connected to a switch and the clasp element, the abutting element connected to the linking-up structure, wherein the switch is for driving the linking-up structure to release the clasp element to further disengage the clasping state, and driving the linking-up structure to uplift the abutting element to enter the uplifting state;

wherein the linking-up structure comprises:

a driving element;

a first shaft, individually connected to the switch and the driving element;

a driven element; and a second shaft, wherein the driven element and the abutting element are mounted on the second shaft;

a fixed seat, provided at a shell, the first shaft and the second shaft substantially parallel and rotatably provided on the fixed seat;

arranged such that the switch, the first shaft and the driving element are synchronously rotatable in a first direction to enter the uplifting state from the clasping state, thereby causing the driving element to drive the driven element to rotate the second shaft; and the abutting element, the second shaft and the driven element are synchronously rotatable in a second direction to enter the clasping state from the uplifting state, thereby causing the driven element to release the driving element to allow the first shaft to rotate.

2. The linking-up mechanism module according to claim 1, wherein the linking-up structure further comprises:

a first elastic element, providing a first elastic restoring force, causing the driving element to rotate towards the clasping state; and a second elastic element, providing a second elastic restoring force, causing the abutting element to rotate towards the uplifting state.

3. A docking station, adapted to repeatedly clasp in a clasping state and uplift in an uplifting state an electronic device, the docking station comprising:

a shell having a first surface, a first opening and at least one second opening; and a linking-up mechanism module, provided at the shell, the linking-up mechanism module comprising:

a switch;

a clasp element;

a linking-up structure, connected to the switch and the clasp element; and an abutting element, connected to the linking-up structure;

wherein, in the clasping state, the switch is located at a first position, the clasp element is located at a clasping position, and the abutting element is located at a sunken position;

wherein the linking-up structure comprises:

a fixed seat, provided at the shell;

a driving element, having a first end portion and a second end portion, the second end portion being opposite the first end portion, the first end portion connected to the clasp element;

a first shaft, rotatably provided on the fixed seat, the first shaft individually connected to the switch and the second end portion of the driving element;

a second shaft, rotatably provided on the fixed seat; and a driven element, having a third end portion and a fourth end portion, the fourth end portion being opposite the third end portion, the fourth end portion connected to the second shaft;

wherein the abutting element has a fifth end portion and a sixth end portion, the sixth end portion is opposite the fifth end portion, the fifth end portion is connected to the second shaft, and the sixth end portion uplifts the electronic device;

arranged such that when the switch is pressed to a second position to enter the uplifting state, the linking-up structure and the clasp element are synchronously driven, the clasp element first rotates to an unlocking position and then drives the linking-up structure to drive and uplift the abutting element from the sunken position to an uplifting position; and when the clasp element is located at the clasping position, the clasp element protrudes out of the first opening and hooks the electronic device; and when the claps element is located at the unlocking position, the clasp element is rotated to be located within the first opening, and the at least one abutting element is uplifted to the uplifting position and extends out from the at least one second opening to push the electronic device away from the first surface; and when the switch is located at the first position, the clasp element is located at the clasping position to cause the second end portion of the driving element to abut against the third end portion of the driven element, and the at least one abutting element is at the sunken position; and when the switch is pressed to the second position, the first shaft accordingly rotates to drive and rotate the driving element, the first end portion is away from the third end portion, the third end portion rotates along with the fourth end portion to rotate the second shaft to drive and rotate the at least one abutting element, such that the at least one abutting element uplifts from the sunken position to the uplifting position.

4. The docking station according to claim 3, wherein the linking-up structure further comprises a first elastic element and a second elastic element, the first elastic element is sleeved on the first shaft and is connected between the clasp element and the fixed seat, the second elastic element is connected between at least one first hook portion of the fixed seat and the fifth end portion; arranged such that when the clasp element is located at the unlocking position, the first elastic element provides a first elastic restoring force; and when the second end portion of the driving element uplifts the third end portion of the driven element, the first elastic restoring force pushes the clasp element to the clasping position; meanwhile, the at least one abutting element is located at the sunken position and the fifth end portion is away from the fixed seat, such that the second elastic element is stretched to produce a second elastic restoring force; and when the second shaft rotates, the second elastic restoring force provided by the second elastic element causes the abutting element to uplift from the sunken position to the uplifting position.

5. The docking station according to claim 4, wherein the driven element further comprises a recessed portion connected between the third end portion and the fourth end portion; arranged such that when the clasp element is located at the unlocking position, the two end portions are abutted in the recessed portion, and the fifth end portion is close to the at least one first hook portion.

6. The docking station according to claim 5, wherein the shell has a second surface, the second surface is opposite the first surface, a plurality of bumps are formed on the second surface, and the fixed seat has a third surface that is connected to the bumps, such that the fixed seat is located at an interval below the second surface.

* * * * *